United States Patent Office.

ERNST KÖRTING, OF HANOVER, PRUSSIA, GERMANY.

APPARATUS FOR ELEVATING LIQUIDS.

SPECIFICATION forming part of Letters Patent No. 339,663, dated April 13, 1886.

Application filed October 26, 1885. Serial No. 180,974. (No model.)

*To all whom it may concern:*

Be it known that I, ERNST KÖRTING, a subject of the King of Prussia, and residing at Hanover, Prussia, German Empire, have invented new and useful Improvements in Apparatus for Elevating Liquids by means of Steam or Compressed Gases, of which the following is a specification.

My invention relates to apparatuses for raising water or other liquids by means of steam or compressed gases acting on the surface of the liquid within a suitable chamber having valves for the inlet and the discharge of the said liquid; and the improvements consist in the particular mode of providing the chamber with an induction and an eduction valve for the operating agent, and of combining therewith a float for actuating the said valves; in means for preventing these valves from being open both at a time; moreover, in a construction of the valves and the float so that the latter in rising and sinking will alternately open and close the valves suddenly and with a considerable amount of energy, and, finally, in providing the apparatus, when operating by steam, with a check-valve in the steam-eduction pipe, for the purpose of adapting the same to draw in liquid by means of the vacuum produced by condensation of the steam.

On the annexed sheet of drawings an apparatus involving my invention is represented in vertical section by Figure 1. Fig. 2 is a sectional view of the improved induction-valve. Fig. 3 is a vertical section of the apparatus with modified float, and Fig. 4 a section on line *x x* of Fig. 3. Fig. 5, finally, is a sectional view of the check-valve that may be fitted to the eduction-pipe.

A is the chamber of the apparatus, B the inlet-valve for the liquid to be raised, and C the discharge-valve. When the apparatus operates solely by the pressure of steam or gas, the liquid has to run into the chamber from a higher point.

G is the induction-valve for the steam or gas entering through the pipe E, and H the eduction-valve for the operating agent passing out through F.

D is the float. When the liquid is at a medium height in the chamber, the said float swims in the same. The induction-valve is so arranged that it will open from the chamber *t* outwardly—*i. e.*, toward or into the pipe E—while the eduction-valve opens toward the interior of the chamber. The former will consequently tend to close by the pressure of the steam, &c., in the pipe E, and the latter by the pressure in the chamber, and a certain force will be required to open either of them.

The valves are so connected together and to the float D by a lever or otherwise that when one valve is closed the other will be open, and that the float in rising and sinking will operate the valves.

According to Fig. 1 the valves are connected together by the lever I, and this lever is jointed by a link to the lever K, having pivoted to it a rod passing through the float and maintained in vertical position by the guiding-lever L, and upon which the float may slide between the limits determined by the collars M and N.

Supposing the chamber to be relieved of steam or gas pressure, liquid will run into the same, and, in rising within the chamber, it will make the float exercise an upward pressure against the collar M, and consequently against the valves G and H. The float will then stop in this position until, by a further increase of liquid in the chamber, the displacement of liquid by the float will have become great enough to impart to the said float a sufficient tendency to rise, or energy directed upward as that the same may overcome the steam or gas pressure acting on the induction-valve. The float will then suddenly open this valve and close the eduction-valve, fresh steam or gas thereupon entering into the chamber and pressing the liquid out through the discharge-valve C. While now the liquid falls the float bears against the collar N, and consequently acts through the described connections in downward direction on the valves and when by the further decrease of the liquid, the displacement thereof by the float has decreased by so much as that the portion of weight of the float unsupported by the liquid exceeds the steam-pressure acting from the inside of the chamber on the eduction-valve, the float will have acquired a sufficient tendency to sink or power to overcome the said pressure. It will then quickly throw open the eduction-valve and close the induction-valve. The admission of fresh steam or open neck, P, through which the discharge-pipe O passes down into the float, as and for the purpose described.

5. The combination, with the chamber A, valves B, C, G, and H, and float D, connected to the valves G and H, of a check-valve, T, placed in the steam-eduction pipe, as and for the purpose specified.

In testimony whereof I have signed my name to this specification in the presence of two subscribing witnesses.

ERNST KÖRTING.

Witnesses:
  HENRY SPRINGMANN,
  B. ROI.

(No Model.) 3 Sheets—Sheet 1.
S. R. KROM.
ROLLER ORE CRUSHER.
No. 339,664. Patented Apr. 13, 1886.
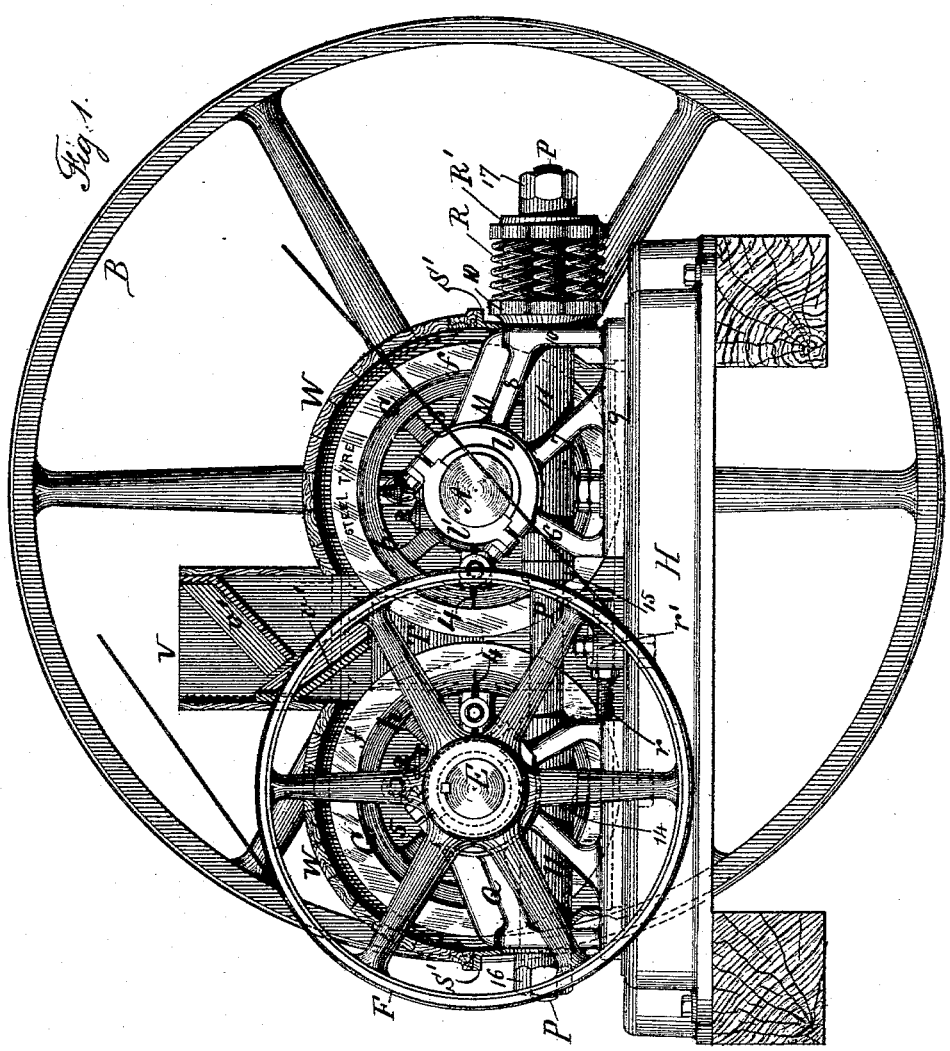
Witnesses:
J. Staib
Chos H. Smith
Inventor:
Stephen R. Krom
per Lemuel W. Serrell
atty